United States Patent
Song et al.

(10) Patent No.: US 8,611,295 B2
(45) Date of Patent: Dec. 17, 2013

(54) ADAPTIVE RESOURCE PARTITIONING INFORMATION (ARPI) TRANSITION BEHAVIOR IN HETEROGENEOUS NETWORKS

(75) Inventors: Osok Song, San Diego, CA (US); Madhavan Srinivasan Vajapeyam, San Diego, CA (US); Tingfang Ji, San Diego, CA (US); Aleksandar Damnjanovic, Del Mar, CA (US); Alan Barbieri, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 192 days.

(21) Appl. No.: 13/164,713

(22) Filed: Jun. 20, 2011

(65) Prior Publication Data

US 2011/0310802 A1    Dec. 22, 2011

Related U.S. Application Data

(60) Provisional application No. 61/356,999, filed on Jun. 21, 2010.

(51) Int. Cl.
*H04W 4/00* (2009.01)

(52) U.S. Cl.
USPC .......................................... 370/329

(58) Field of Classification Search
USPC ........................ 370/310–350, 395.4, 464–465
See application file for complete search history.

(56) References Cited

U.S. PATENT DOCUMENTS

| | | | |
|---|---|---|---|
| 7,881,339 B2 * | 2/2011 | Smee et al. .................. | 370/468 |
| 8,295,227 B2 * | 10/2012 | Katayama et al. ........... | 370/328 |
| 8,423,008 B2 * | 4/2013 | Pedersen et al. .............. | 455/418 |
| 8,494,467 B2 * | 7/2013 | Henttonen et al. ........... | 455/136 |
| 2008/0045272 A1 | 2/2008 | Wang et al. | |
| 2009/0109916 A1 | 4/2009 | Berg et al. | |
| 2009/0131065 A1 | 5/2009 | Khandekar et al. | |
| 2010/0074200 A1 * | 3/2010 | Li et al. ........................ | 370/329 |
| 2010/0097978 A1 | 4/2010 | Palanki et al. | |
| 2010/0220683 A1 * | 9/2010 | Novak et al. .................. | 370/330 |
| 2011/0092231 A1 | 4/2011 | Yoo et al. | |
| 2011/0249611 A1 * | 10/2011 | Khandekar et al. .......... | 370/315 |
| 2011/0310830 A1 * | 12/2011 | Wu et al. ....................... | 370/329 |
| 2012/0113812 A1 * | 5/2012 | Ji et al. ......................... | 370/241 |
| 2012/0122440 A1 * | 5/2012 | Krishnamurthy et al. .... | 455/418 |
| 2012/0275440 A1 * | 11/2012 | Park et al. .................... | 370/336 |

(Continued)

FOREIGN PATENT DOCUMENTS

WO    WO2010062035 A2    6/2010
WO    WO2011034966 A1    3/2011

OTHER PUBLICATIONS

3GPP TR 36.922, LTE E-UTRA HeNB RS Requirement Analysis, version 9.1.0, Release 9. http://www.etsi.org/deliver/etsi_tr/136900_136999/136922/09.01.00_60/tr_136922v090100p.pdf.*

(Continued)

*Primary Examiner* — Warner Wong
(74) *Attorney, Agent, or Firm* — Seyfarth Shaw LLP

(57) ABSTRACT

One aspect discloses transition behavior of dynamically changing subframe interlaces and the corresponding behavior of the bases stations during the changing. A method of wireless communication includes receiving a request to dynamically change a subframe interlace. The subframe interlace is transitioned and during the transition either new data transmission is prevented on the prohibited subframe interlace and/or retransmissions are allowed on the prohibited subframe interlace.

24 Claims, 11 Drawing Sheets

(56) References Cited

U.S. PATENT DOCUMENTS

| | | | |
|---|---|---|---|
| 2013/0028189 A1* | 1/2013 | Bourlas | 370/328 |
| 2013/0044704 A1* | 2/2013 | Pang et al. | 370/329 |
| 2013/0065599 A1* | 3/2013 | Chan et al. | 455/446 |
| 2013/0114435 A1* | 5/2013 | Wang et al. | 370/252 |
| 2013/0182630 A1* | 7/2013 | Yamamoto | 370/312 |
| 2013/0203398 A1* | 8/2013 | Callard et al. | 455/418 |

OTHER PUBLICATIONS

"3rd Generation Partnership Project ; Technical Specification Group Radio Access Networks; Evolved Universal Terrestrial Radio Access (E-UTRA) ; LTE TDD Home eNodeB RF Requirements (Release 9)", 3GPP DRAFT; R4-101078_LTE TDD HENB RF Requirements TR36.922 V1.2.1_REV1, 3rd Generation Partnership Project (3GPP), Mobile Competence Centre ; 650, Route Des Lucioles ; F-06921 Sophia-Antipolis Cedex ; France, vol. RAN W64, No. San Francisco, USA; 20100222, May 24, 2010, XP050426468, [retrieved on 2010-05-24] paragraph C05.11.

CATT: Adding time Information to ABS configuration, 36PP DRAFT; R3-110071, 3rd Generation Partnership Project (3GPP), Mobile Competence Centre; 650, Route Des Lucioles; F-06921 Sophia-Antipolis Cedex; France, vol. RAN W63, No. Dublin, Ireland; 20110117, Jan. 17, 2011, XP050474828, [retrieved on Jan. 11, 2011].

CATT: Discussion on some open issues about ABS configuration, 3GPP DRAFT; R3-110070, 3rd Generation Partnership Project (3GPP), Mobile Competence Centre; 650, Route Des Lucioles; F-06921 Sophia-Antipolis Cedex; France, vol. RAN W63, No. Dublin, Ireland; 20110117, Jan. 11, 2011, XP050497110, [retrieved on Jan. 11, 2011] the whole document.

CATT: Impact of the TDD Tall Problem, 3GPP DRAFT; R2-111261—Impact of the TDD Tail Problem, 3rd Generation Partnership Project (3GPP), Mobile Competence Centre; 650, Route Des Lucioles; F-06921 Sophia-Anti Polis Cedex; France, vol. RAN WG2, No. Taipei, Taiwan; 20110221, Feb. 15, 2011, XP050493752, [retrieved on Feb. 15, 2011] the whole document.

Ericsson.et al: "On measurement restrictions patterns in TDM ICIC", 3GPP DRAFT; R2-110121—On Measurement Restriction Patterns in TDN ICIC , 3rd Generation Partnership Project (3GPP), Mobile Competence Centre; 650, Route Des Lucioles; F-06921 Sophia-Antipolis Cedex ; France, vol. RAN WG2, No. Dublin, Irel and; 20110117, Jan. 11, 2011, XP050492901, [retrieved on Jan. 11, 2011].

International Search Report and Written Opinion—PCT/US2011/041296—ISA/EPO—Oct. 24, 2011.

New Postcom: Discussion on remaining ABS-related issues in eICIC for TDD-LTE, 3GPP DRAFT; R1-110944_Discussion on Remaining ABS-Related Issues in eICIC for TDD-LTE, 3rd Generation Partnership Project (3GPP), Mobile Competence Centre ; 650, Route Des Lucioles ; F-06921 Sophia-Antipolis Cedex ; France, vol. RAN WG1, No. Taipei, Taiwan; 20110221, Feb. 15, 2011, XP050490672, [retrieved on Feb. 15, 2011] the whole document.

* cited by examiner

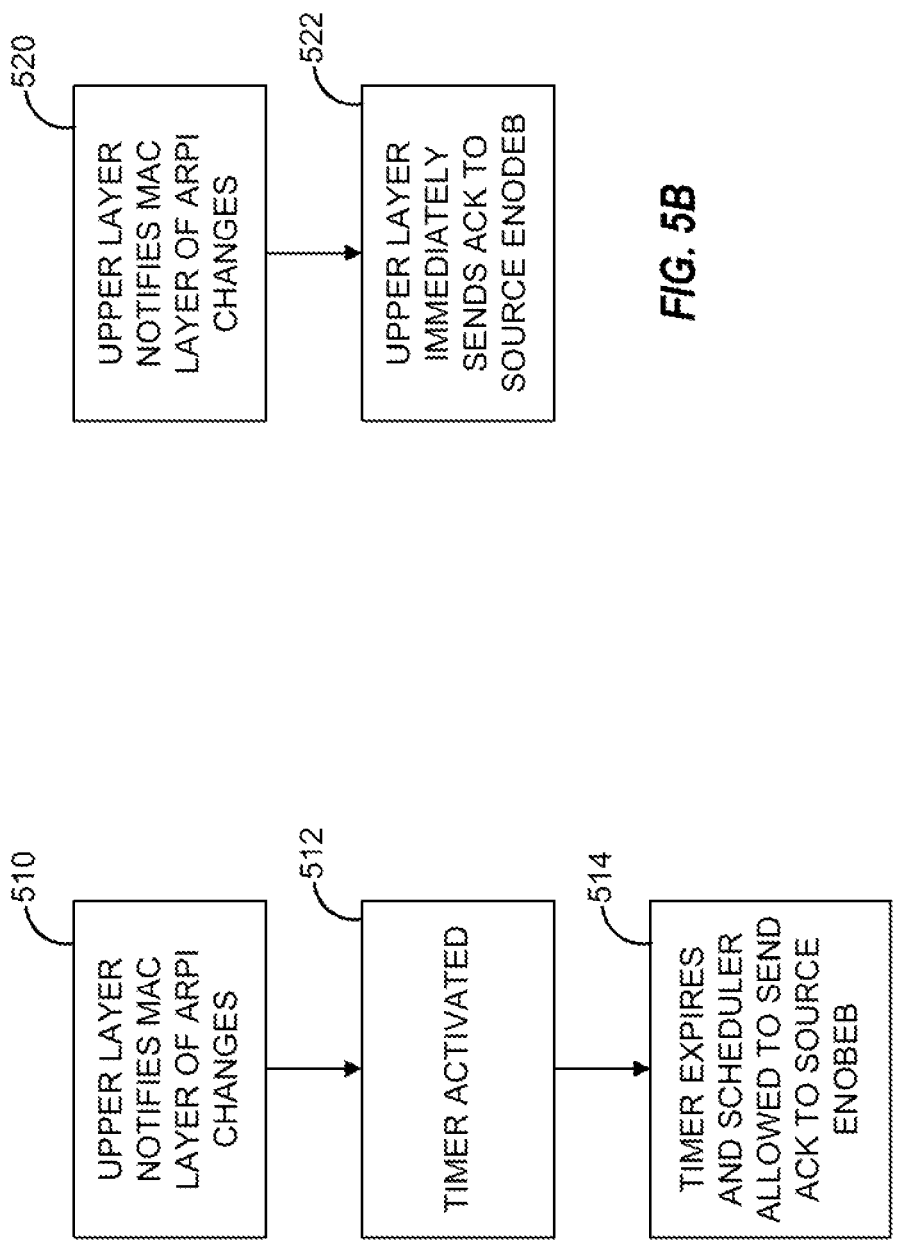

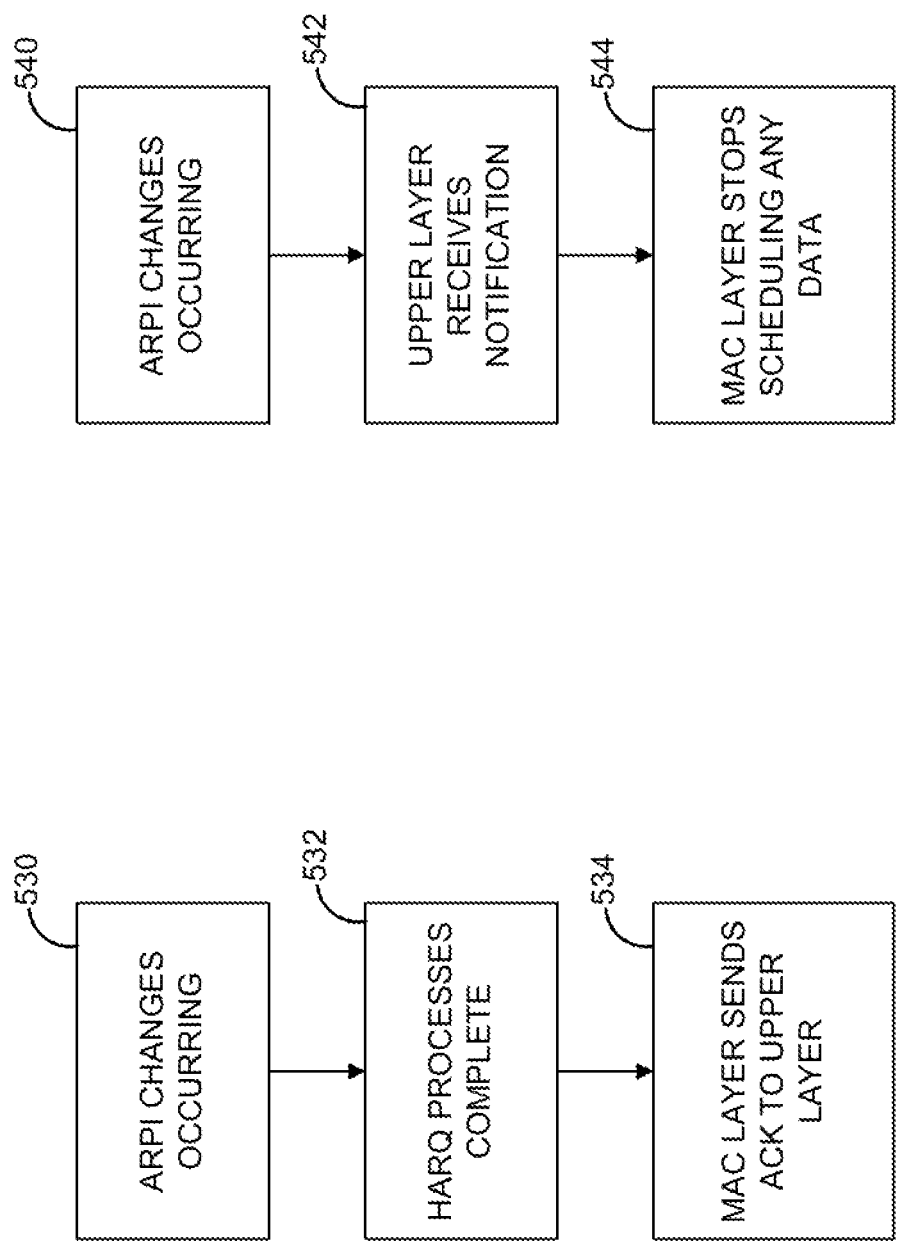

ADAPTIVE RESOURCE PARTITIONING INFORMATION (ARPI) TRANSITION BEHAVIOR IN HETEROGENEOUS NETWORKS

CROSS-REFERENCE TO RELATED APPLICATION

This application claims the benefit under 35 U.S.C. §119 (e) to U.S. Provisional Patent Application No. 61/356,999 entitled "Adaptive Resource Partitioning Information (ARPI) Transition Behavior in Heterogeneous Networks," filed on Jun. 21, 2010, the disclosure of which is expressly incorporated by reference herein in its entirety.

BACKGROUND

1. Field

Aspects of the present disclosure relate generally to wireless communication systems, and more particularly to transitioning between states in a heterogeneous network having adaptive resource partitioning information (ARPI).

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink; a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

One aspect discloses transition behavior of dynamically changing subframe interlaces and the corresponding behavior of the bases stations during the changing.

In one aspect, a method of wireless communication is disclosed. The method includes receiving a request from a second eNodeB to dynamically change a subframe interlace to a prohibited subframe interlace. It is noted that the term "prohibited" refers to both: (1) prohibited for all UEs, and also (2) prohibited for a certain class of UEs. The subframe interlace is transitioned to the prohibited subframe interlace in accordance with the request by preventing new data transmission on the prohibited subframe interlace and allowing retransmission on the prohibited subframe interlace.

Another aspect discloses a method of wireless communication and includes receiving a request from a second eNodeB to dynamically change a subframe interlace to a prohibited subframe interlace. The subframe interlace is transitioned to the prohibited subframe interlace in accordance with the request by preventing new data transmission on the prohibited subframe interlace, and preventing pending retransmissions on the prohibited subframe interlace. All pending retransmissions waiting scheduling on the subframe interlace are stopped and the corresponding packets are discarded.

In another aspect, an apparatus for wireless communication is disclosed and includes means for receiving a request from a second eNodeB to dynamically change a subframe interlace to a prohibited subframe interlace. Also included is means for transitioning the subframe interlace to the prohibited subframe interlace in accordance with the request by preventing new data transmission on the prohibited subframe interlace and allowing retransmission on the prohibited subframe interlace.

Another aspect discloses an apparatus including means for receiving a request from a second eNodeB to dynamically change a subframe interlace to a prohibited subframe interlace. Also included is means for transitioning the subframe interlace to the prohibited subframe interlace in accordance with the request by preventing new data transmission on the prohibited subframe interlace, and preventing pending retransmissions on the prohibited subframe interlace. Also included is means for stopping all pending retransmissions that had to be scheduled on the subframe interlace and discarding the corresponding packets.

In another aspect, a computer program product for wireless communications in a wireless network is disclosed. The computer readable medium has program code recorded thereon which, when executed by the processor(s), causes the processor(s) to perform operations of receiving a request from a second eNodeB to dynamically change a subframe interlace to a prohibited subframe interlace. The program code also causes the processor(s) to transition the subframe interlace to the prohibited subframe interlace in accordance with the request by preventing new data transmission on the prohibited subframe interlace and allowing retransmission on the prohibited subframe interlace.

Another aspect discloses a computer program product for wireless communications in a wireless network. The computer readable medium has program code recorded thereon which, when executed by the processor(s), causes the processor(s) to perform operations of receiving a request from a second eNodeB to dynamically change a subframe interlace to a prohibited subframe interlace. The program code also causes the processor(s) to transition the subframe interlace to the prohibited subframe interlace in accordance with the request by preventing new data transmission on the prohibited subframe interlace, and prevent pending retransmissions on the prohibited subframe interlace. The program code also causes the processor(s) to stop all pending retransmissions that had to be scheduled on the subframe interlace and to discard the corresponding packets.

Another aspect discloses a wireless communication apparatus having a memory and at least one processor coupled to the memory. The processor(s) is configured to receive a request from a second eNodeB to dynamically change a subframe interlace to a prohibited subframe interlace. The processor(s) is also configured to transition the subframe interlace to the prohibited subframe interlace in accordance with the request by preventing new data transmission on the prohibited subframe interlace and allowing retransmission on the prohibited subframe interlace.

In another aspect, a wireless communication apparatus has a memory and at least one processor coupled to the memory. The processor(s) is configured to receive a request from a second eNodeB to dynamically change a subframe interlace to a prohibited subframe interlace. The processor(s) is also configured to transition the subframe interlace to the prohibited subframe interlace in accordance with the request by preventing new data transmission on the prohibited subframe interlace, and preventing pending retransmissions on the prohibited subframe interlace. Additionally, the processor(s) is configured to stop all pending retransmissions that had to be scheduled on the subframe interlace and discard the corresponding packets.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIGS. 5A-5D illustrate transition behavior during an ARPI change.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Figure 1:
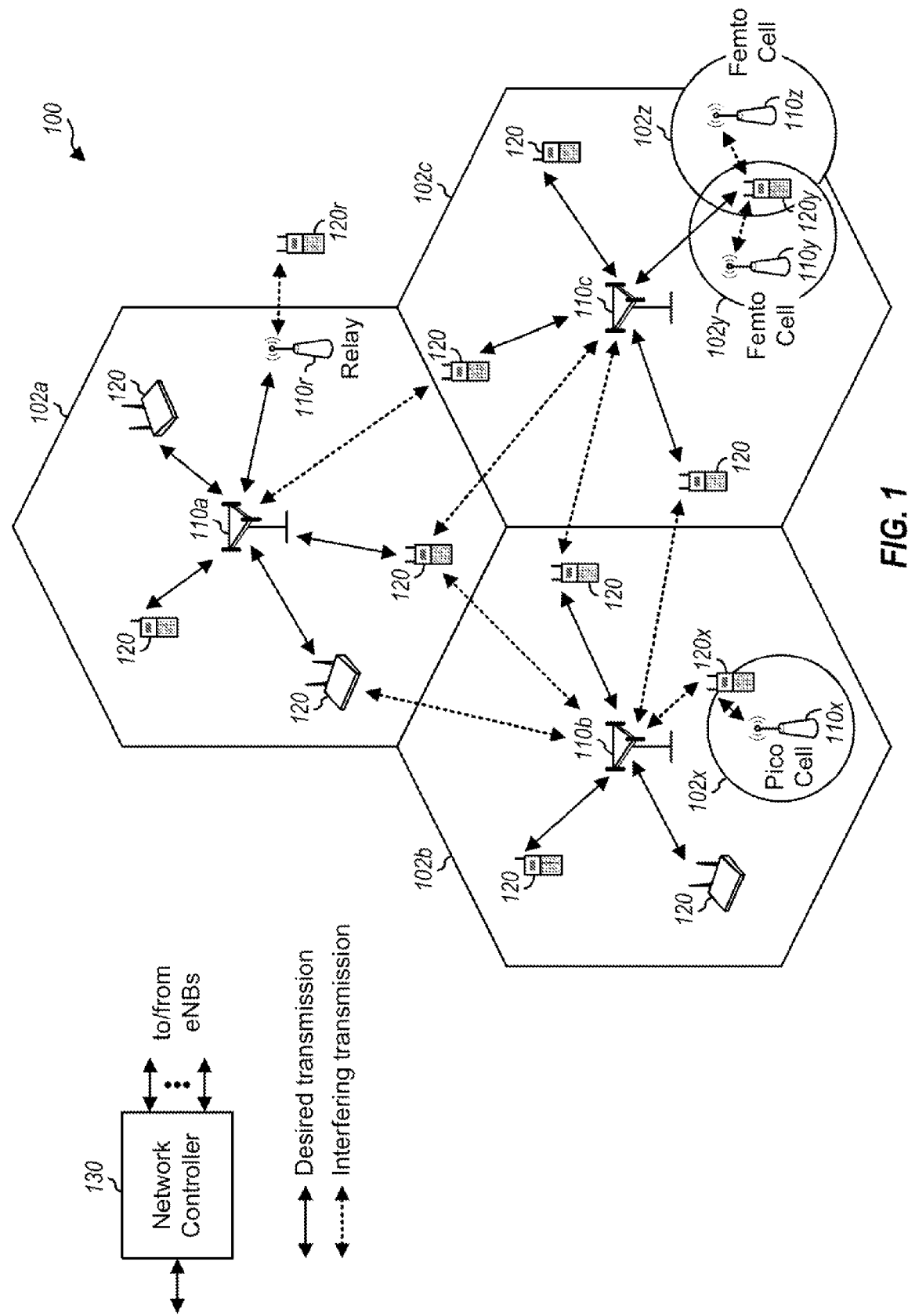
FIG. 1 is a block diagram conceptually illustrating an example of a telecommunications system.

FIG. 1 shows a wireless communication network 100, which may be an LTE-A network. The wireless network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. The term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell.

A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, etc.). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. In the example shown in FIG. 1, the eNodeBs 110a, 110b and 110c are macro eNodeBs for the macro cells 102a, 102b and 102c, respectively. The eNodeB 110x is a pico eNodeB for a pico cell 102x. And, the eNodeBs 110y and 110z are femto eNodeBs for the femto cells 102y and 102z, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB, UE, etc.) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous operation. For synchronous operation, the eNodeBs may have similar frame timing, and transmissions from different eNodeBs may be approximately aligned in time. In one aspect, the wireless network 100 may support Frequency Division Duplex (FDD) or Time Division Duplex (TDD) modes of operation. The techniques described herein may be used for either FDD or TDD mode of operation.

A network controller 130 may couple to a set of eNodeBs 110 and provide coordination and control for these eNodeBs 110. The network controller 130 may communicate with the eNodeBs 110 via a backhaul. The eNodeBs 110 may also communicate with one another, e.g., directly or indirectly via a wireless backhaul or a wireline backhaul.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, a tablet, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz (i.e., 6 resource blocks), and there may be 1, 2, 4, 8 or 16 sub-bands for a corresponding system bandwidth of 1.25, 2.5, 5, 10, 15 or 20 MHz, respectively.

Figure 2:
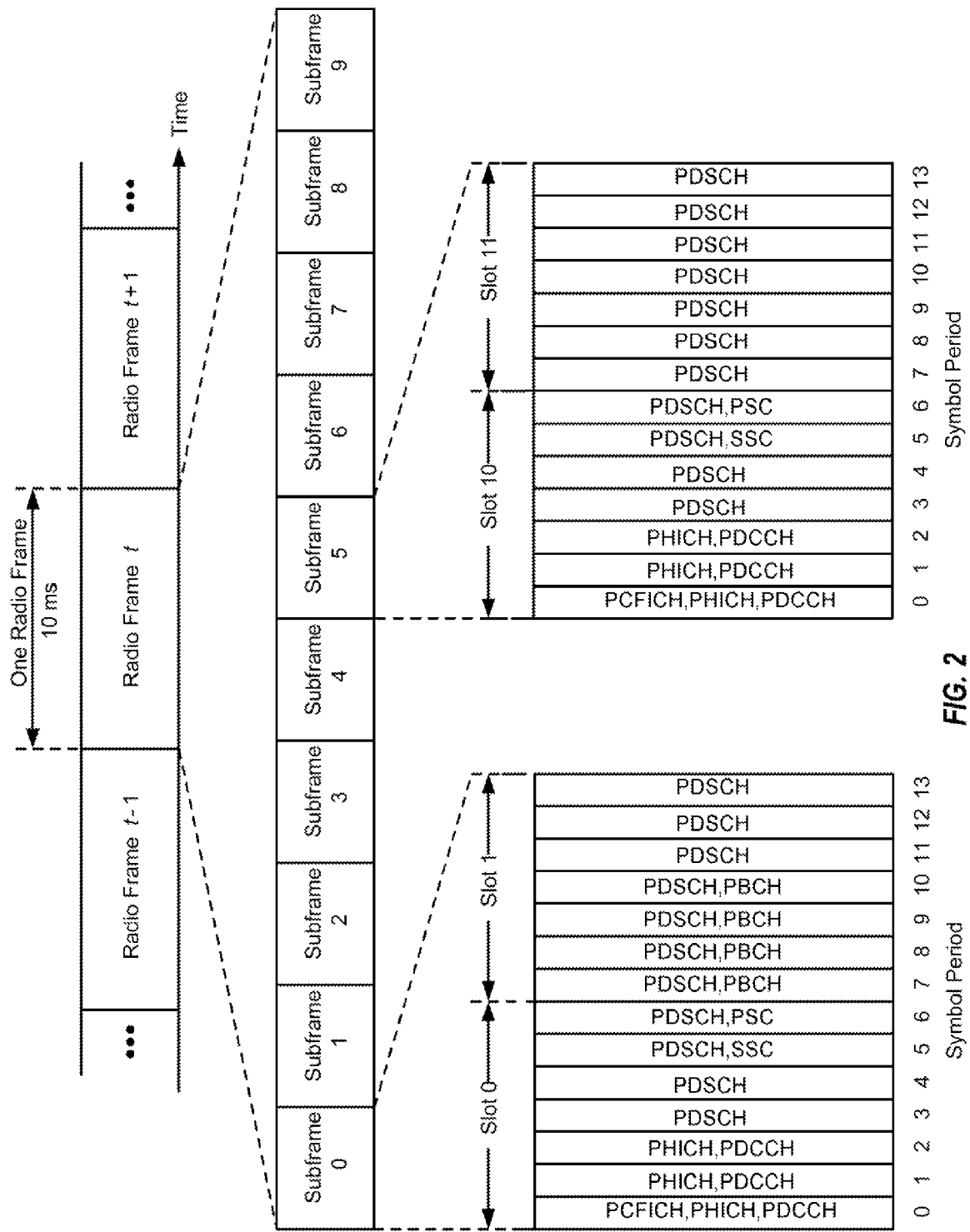
FIG. 2 is a diagram conceptually illustrating an example of a downlink frame structure in a telecommunications system.

FIG. 2 shows a downlink FDD frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 4:
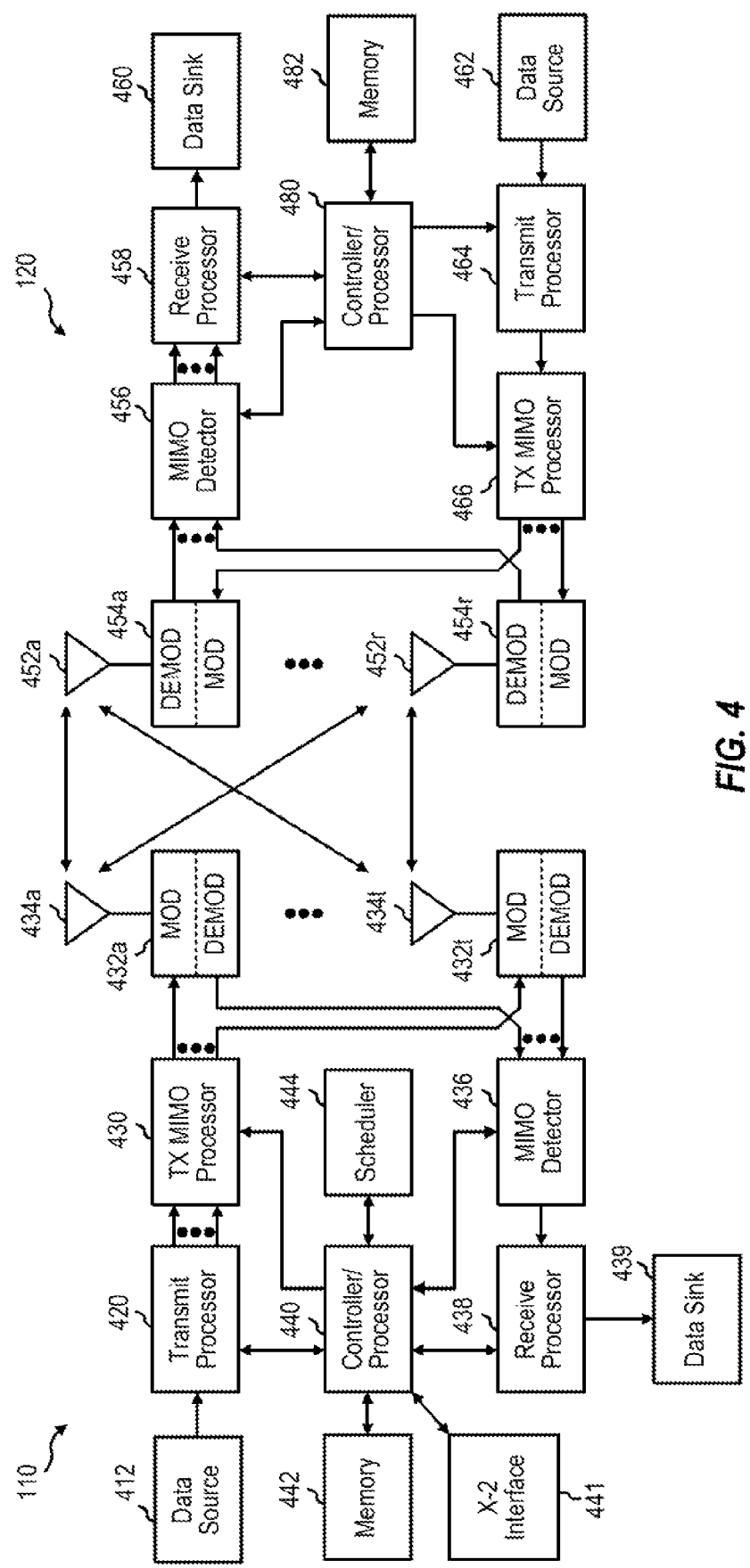
FIG. 4 is a block diagram conceptually illustrating a design of a base station/eNodeB and a UE configured according to one aspect of the present disclosure.

FIG. 4 shows a block diagram of a design of a base station/eNodeB 110 and a UE 120, which may be one of the base stations/eNodeBs and one of the UEs in FIG. 1. The base station 110 may be the macro eNodeB 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODS) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the modulators 454a through 454r (e.g., for SC-FDM, etc.), and transmitted to the base station 110. At the base station 110, the uplink signals from the UE 120 may be received by the antennas 434, processed by the demodulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440. The base station 110 can send messages to other base stations, for example, over an X2 interface 441.

The controllers/processors 440 and 480 may direct the operation at the base station 110 and the UE 120, respectively. The processor 440 and/or other processors and modules at the base station 110 may perform or direct the execution of various processes for the techniques described herein. The processor 480 and/or other processors and modules at the UE 120 may also perform or direct the execution of the functional blocks illustrated in use method flow chart FIGS. 10A-10B, and/or other processes for the techniques described herein. The memories 442 and 482 may store data and program codes for the base station 110 and the UE 120, respectively. A scheduler 444 may schedule UEs for data transmission on the downlink and/or uplink.

A UE may be within the coverage of multiple eNodeBs and one of these eNodeBs may be selected to serve the UE. The serving eNodeB may be selected based on various criteria such as, but not limited to, received power, path loss, signal to noise ratio (SNR), etc.

In deployments of heterogeneous networks, such as the wireless network 100, a UE may operate in a dominant interference scenario in which the UE may observe high interference from one or more interfering eNodeBs. A dominant interference scenario may occur due to restricted association. For example, in FIG. 1, the UE 120y may be close to the femto eNodeB 110y and may have high received power for the eNodeB 110y. However, the UE 120y may not be able to access the femto eNodeB 110y due to restricted association and may then connect to the macro eNodeB 110c (as shown in FIG. 1) or to the femto eNodeB 110z also with lower received power (not shown in FIG. 1). The UE 120y may then observe high interference from the femto eNodeB 110y on the downlink and may also cause high interference to the eNodeB 110y on the uplink. Using coordinated interference management, the eNodeB 110c and the femto eNodeB 110y may communicate over the backhaul to negotiate resources. In the negotiation, the femto eNodeB 110y agrees to cease transmission on one of its channel resources, such that the UE 120y will not experience as much interference from the femto eNodeB 110y as it communicates with the eNodeB 110c over that same channel.

In addition to the discrepancies in signal power observed at the UEs in such a dominant interference scenario, timing delays of downlink signals may also be observed by the UEs, even in synchronous systems, because of the differing distances between the UEs and the multiple eNodeBs. The eNodeBs in a synchronous system are presumptively synchronized across the system. However, for example, considering a UE that is a distance of 5 km from the macro eNodeB, the propagation delay of any downlink signals received from that macro eNodeB would be delayed approximately 16.67 μs (5 km÷3×108, i.e., the speed of light, 'c'). Comparing that downlink signal from the macro eNodeB to the downlink signal from a much closer femto eNodeB, the timing difference could approach the level of a time tracking loop (TTL) error.

A dominant interference scenario may also occur due to range extension, which is a scenario in which a UE connects to an eNodeB with lower signal to noise ratio (SNR) among the eNodeBs detected by the UE. For example, in FIG. 1, the UE 120x may detect the macro eNodeB 110b and the pico eNodeB 110x and may have lower received power for the eNodeB 110x than the eNodeB 110b. Nevertheless, it may be desirable for the UE 120x to connect to the pico eNodeB 110x if the path loss for the eNodeB 110x is lower than the path loss for the macro eNodeB 110b. This may result in less interference to the wireless network for a given data rate for the UE 120x.

With range extension enabled in a wireless network, such as the wireless network 100, in order for UEs to obtain service from a lower power base station (i.e., a pico or femto base station) in the presence of a macro base station with stronger downlink signal strength, or for the UEs to obtain service from a macro base station in the presence of a strongly interfering signal from a femto base station to which the UE is not authorized to connect, an enhanced inter-cell interference coordination (eICIC) may be used to coordinate the interfering base station giving up some resources in order to enable control and data transmissions between the UE and the serving base station. When a network supports eICIC, the base stations negotiate with each other to coordinate resources in order to reduce/eliminate interference by the interfering cell giving up part of its resources. With this, a UE can access the serving cell even with severe interference by using the resources yielded by the interfering cell.

A coverage lapse within a macro cell may exist when a femto cell with a closed access mode, in which only member femto UEs may access the cell, lies within the coverage area of the macro cell. By making this femto cell give up some of its resources, the UE within the femto cell coverage area may access its serving macro cell by using the resources yielded by the femto cell. In a radio access system using OFDM such as E-UTRAN, these yielded resources may be time-based, frequency-based, or a combination of both. When the yielded resources are time-based, the interfering cell refrains from using some of its accessible subframes in the time domain. When these resources are frequency-based, the interfering cell does not use some of its accessible subcarriers in the frequency domain. When the yielded resources are a combination of both frequency and time, the interfering cell does not use the resources defined by frequency and time.

For a UE that supports eICIC, the existing criteria for analyzing RLF conditions may not satisfactorily address the conditions of the coordinating cells. When the UE lies in a region with severe interference where the interference is coordinated between base stations by the interfering cell giving up part of its resources, the UE measurement of the signal to noise ratio or the decoding error rate of PDCCH may vary considerably, depending on whether the resources were yielded by the interfering cell. When the LIE measures the signal to noise ratio or the decoding error rate of the PDCCH for the resources which were not yielded by the interfering cell, the UE can erroneously declare an RLF due to high interference, although the UE can still access the serving cell using the resources yielded by the interfering cell.

Heterogeneous networks may use inter-cell interference coordination (ICIC) to reduce interference from cells in co-channel deployment. One ICIC mechanism is time division multiplexing (TDM) partitioning. In TDM partitioning, subframes are assigned to certain eNodeBs. In subframes assigned to a first eNodeB, neighbor eNodeBs do not transmit. Thus, interference experienced by a UE served by the first eNodeB is reduced. Subframe assignment may be performed on both the uplink and downlink channels.

For example, subframes may be allocated between three classes of subframes: protected subframes (U subframes), prohibited subframes (N subframes), and common subframes (C subframes). Protected subframes are assigned to a first eNodeB for use exclusively by the first eNodeB. Protected subframes may also be referred to as "clean" subframes based on the lack of interference from neighboring eNodeBs. Prohibited subframes are subframes assigned to a neighbor eNodeB, and the first eNodeB is prohibited from transmitting data during the prohibited subframes. For example, a prohibited subframe of the first eNodeB may correspond to a protected subframe of a second interfering eNodeB. Thus, the first eNodeB is the only eNodeB transmitting data during the first eNodeB's protected subframe. Common subframes may be used for data transmission by multiple eNodeBs. Common subframes may also be referred to as "unclean" subframes because of the possibility of interference from other eNodeBs.

At least one protected subframe is statically assigned per period. In some cases only one protected subframe is statically assigned. For example, if a period is 8 milliseconds, one protected subframe may be statically assigned to an eNodeB during every 8 milliseconds. Other subframes may be dynamically allocated.

Adaptive resource partitioning information (ARM) allows the non-statically assigned subframes to be dynamically allocated. Any of protected, prohibited, or common subframes may be dynamically allocated (AU, AN, AC subframes, respectively). The dynamic assignments may change quickly, such as, for example, every one hundred milliseconds or less.

Figure 3:
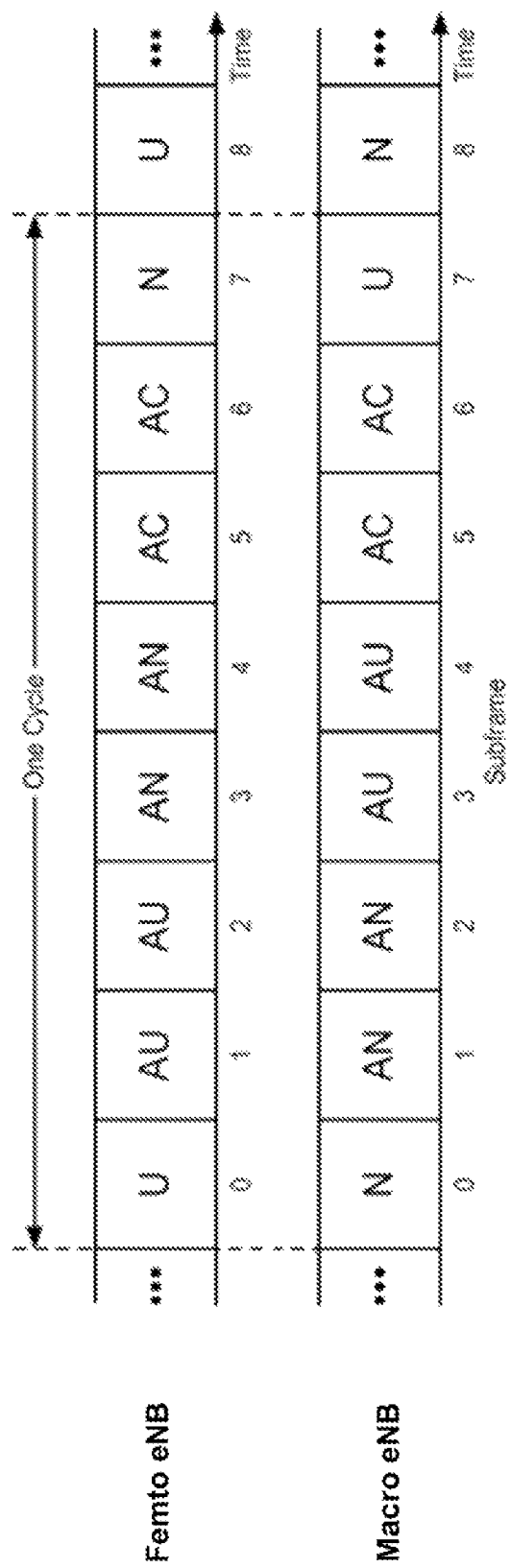
FIG. 3 is a block diagram conceptually illustrating adaptive resource partitioning in a heterogeneous network according to one aspect of the disclosure

Heterogeneous networks may have eNodeBs of different power classes. For example, three power classes may be defined, in decreasing power class, as macro eNodeBs, pico eNodeBs, and femto eNodeBs. When macro eNodeBs, pico eNodeBs, and femto eNodeBs are in a co-channel deployment, the power spectral density (PSD) of the macro eNodeB (aggressor eNodeB) may be larger than the power spectral density of the pico eNodeB and the femto eNodeB (victim eNodeBs) creating large amounts of interference with the pico eNodeB and the femto eNodeB. Protected subframes may be used to reduce or minimize interference with the pico eNodeBs and femto eNodeBs. That is, a protected subframe may be scheduled for the victim eNodeB to correspond with a prohibited subframe on the aggressor eNodeB FIG. 3 is a block diagram illustrating TDM partitioning in a heterogeneous network according to one aspect of the disclosure. A first row of blocks illustrate sub frame assignments for a femto eNodeB, and a second row of blocks illustrate sub frame assignments for a macro eNodeB. Each of the eNodeBs has a static protected sub frame during which the other eNodeB has a static prohibited sub frame. For example, the femto eNodeB has a protected sub frame (U sub frame) in sub frame 0 corresponding to a prohibited sub frame (N sub frame) in sub frame 0. Likewise, the macro eNodeB has a protected sub frame (U sub frame) in sub frame 7 corresponding to a prohibited sub frame (N sub frame) in sub frame 7. Sub frames 1-6 are dynamically assigned as either protected sub frames (AU), prohibited sub frames (AN), and common sub frames (AC). During the dynamically assigned common sub frames (AC) in sub frames 5 and 6, both the femto eNodeB and the macro eNodeB may transmit data.

Protected sub frames (such as U/AU sub frames) have reduced interference and a high channel quality because aggressor eNodeBs are prohibited from transmitting. Prohibited sub frames (such as N/AN sub frames) have no data transmission to allow victim eNodeBs to transmit data with low interference levels. Common sub frames (such as C/AC sub frames) have a channel quality dependent on the number of neighbor eNodeBs transmitting data. For example, if neighbor eNodeBs are transmitting data on the common sub frames, the channel quality of the common sub frames may be lower than the protected sub frames. Channel quality on common sub frames may also be lower for extended boundary area (EBA) UEs that are strongly affected by aggressor eNodeBs. An EBA UE may belong to a first eNodeB but also be located in the coverage area of a second eNodeB. For example, a UE communicating with a macro eNodeB that is near the range limit of a femto eNodeB coverage is an EBA UE.

In response to events occurring on a wireless network, adaptive resource partitioning information (ARPI) may change and dynamically reallocate subframes between eNodeBs of the wireless network. For example, in response to an increasing load at a victim eNodeB, an aggressor eNodeB(s) may be requested to give up some resources or subframes.

The freed up subframes may then be assigned to the victim eNodeB. When the subframes are reassigned, a transitory period occurs during the switching of the subframes which may impact the HARQ process.

Figure 6:
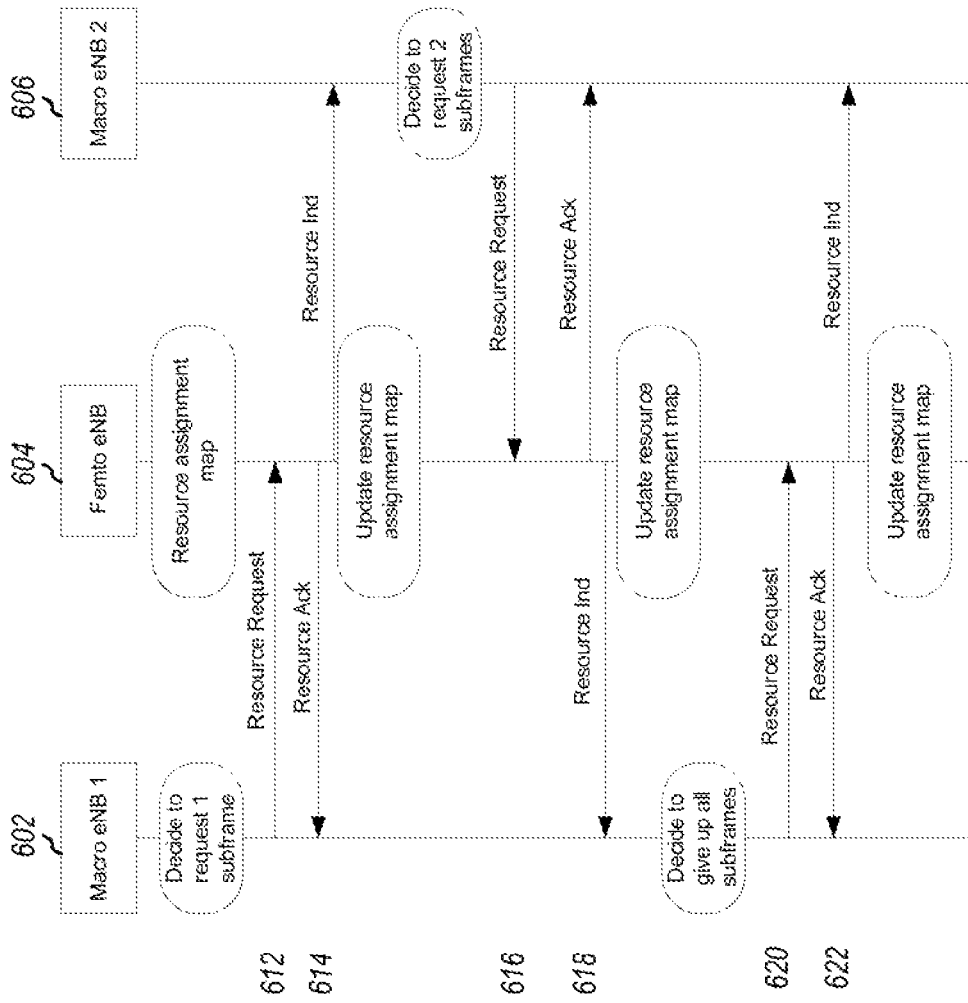
FIG. 6 is a call flow diagram illustrating an event on a wireless network changing adaptive resource partitioning information (ARPI) according to one aspect of the disclosure.

FIG. 6 is a call flow illustrating an event on a wireless network involving a macro eNodeB 602, a femto eNodeB 604 and another macro eNodeB 606 and changing adaptive resource partitioning information (ARPI). At time 612 the first macro eNodeB 602 decides to request one subframe on the wireless network and transmits a resource request to a femto eNodeB 604. At time 614 the femto eNodeB 604 acknowledges the resource request to the first macro eNodeB 602 and transmits a resource indication message to a second macro eNodeB 606 to indicate the change in its ARPI. A resource map of the femto eNodeB 604 is also updated.

Then, at time 616 the second macro eNodeB 606 decides to request two other subframes and transmits a resource request message to the femto eNodeB 604. At time 618 the femto eNodeB 604 transmits an acknowledgement of the resource request to the second macro eNodeB 606 and transmits a resource indication message to the first macro eNodeB 602. A resource map of the femto eNodeB 604 is then updated.

At time 620 the first macro eNodeB 602 decides to free up all subframes and transmits a resource request message to the femto eNodeB 604. The first macro eNodeB 602 may decide to release all subframes because of a reduced load on the first macro eNodeB 602. At time 622 the femto eNodeB transmits an acknowledgement to the first macro eNodeB 602 and sends a resource indication message to the second macro eNodeB 606. The resource map of the femto eNodeB 604 is not updated. The resource map of the femto eNodeB 604 is unable to update to include the subframes released by the first macro eNodeB 602 because the femto eNodeB 604 is constrained by the second macro eNodeB 606.

The subframe partitioning impacts the interlayers communications of an eNodeB. In particular, the subframe partitioning is decided at an upper layer. When ARPI changes on a wireless network, an upper layer of an eNodeB informs a media access control (MAC) layer of the eNodeB, which adapts to the updated ARPI. Additionally, the eNodeB acknowledges the change in ARPI to an upper layer of a requesting eNodeB through, for example, backhaul signaling. Changes in the MAC layer of the eNodeB resulting from updated ARPI will be described in several examples below.

If a subframe interlace at an eNodeB previously marked as AN (prohibited) changes to AU (protected) or AC (common), the eNodeB scheduler may schedule new transmissions on that subframe interlace as soon as the notification is received from the upper layer of the eNodeB. According to one aspect, the eNodeB scheduler schedules transmissions based, in part, on availability of channel quality information such as a Channel Quality Indicator (CQI) report. If channel quality information for a subframe similar to AU or AC is not available, the eNodeB scheduler may wait until relevant channel quality information is available or derive an estimated channel quality from channel quality information belonging to different subframe classes. If the information belongs to a different class, the eNodeB may apply a backoff algorithm to improve the estimate.

If a subframe interlace at an eNodeB previously marked as AC (common) changes to AU (protected), the eNodeB scheduler may continue to schedule transmissions on that subframe interlace. Thus, channel quality information for making scheduling decisions at the eNodeB, such as selecting UEs and a modulation and coding scheme (MCS), changes from unclean to clean.

If a subframe interlace at an eNodeB previously marked as AU (protected) changes to AC (common), the eNodeB scheduler may continue to schedule transmissions on that subframe interlace, but may restrict UEs served by that subframe interlace to non-extended boundary area (EBA) UEs. According to one aspect, channel quality information for making scheduling decisions by the eNodeB scheduler on that subframe interlace changes from clean channel quality information to unclean channel quality information. Handling of pending error correction (e.g., HARQ) processes will be discussed below.

If a subframe interlace at an eNodeB previously marked as AU (protected) or AC (common) changes to AN (reserved), the eNodeB scheduler discontinues scheduling transmissions on that subframe interlace. When a change from AU/AC to AN occurs, a pending automatic retransmission request (e.g., HARQ) process may need that subframe interlace. Although the following description is with respect to HARQ, the description may apply to any automatic retransmission request.

Figure 7A:
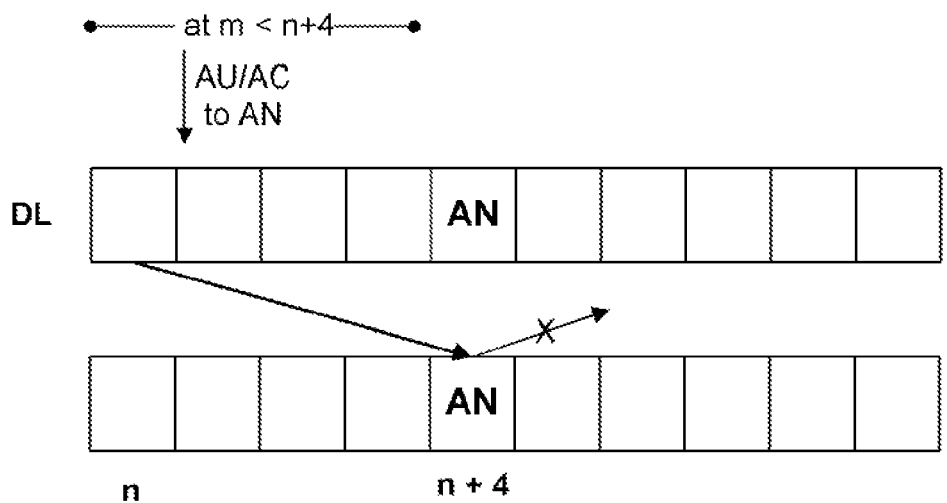
FIGS. 7A-7C illustrate subframe interlaces that become AN subframe interlaces according to one aspect of the disclosure.

For example, a pending HARQ process on an uplink (UL) channel may be present on the subframe interlace because the HARQ timeline is synchronous. That is, referring to FIG. 7A, if an ACK/NACK for a downlink (DL) transmission is expected to be transmitted by a UE at subframe n+4, and at subframe m<n+4 an upper layer notifies the MAC layer that subframe n has changed to AN, the pending HARQ process may not be able to complete on the interlace.

Figure 7B:
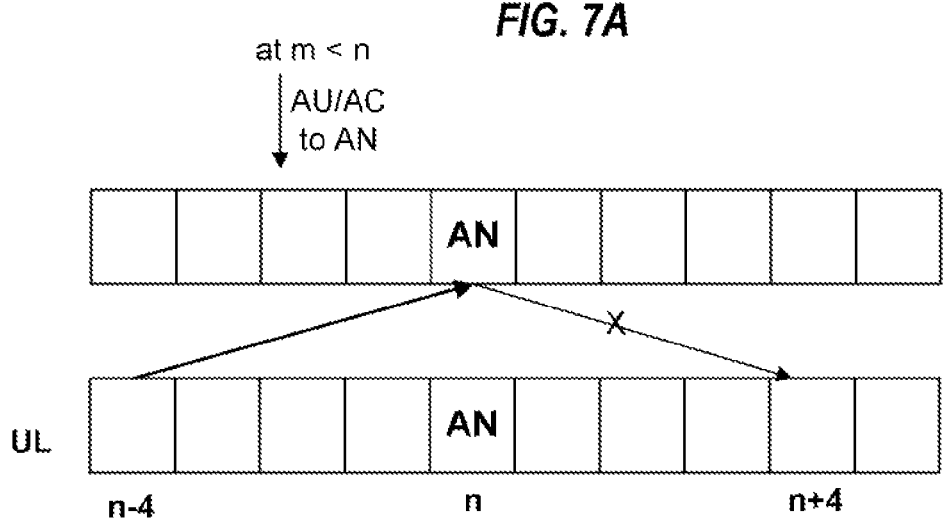
Figure 7C:
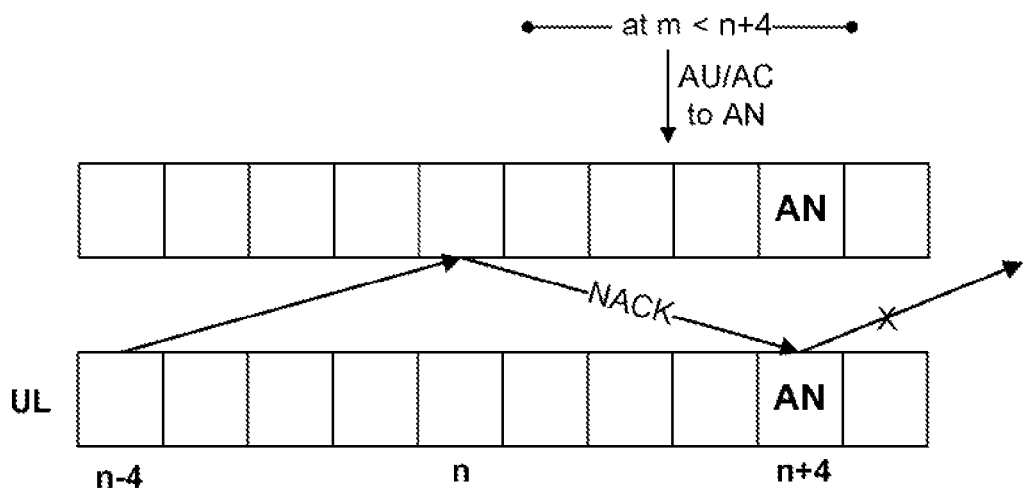

In another example illustrated in FIG. 7B, if an ACK/NACK for an uplink (UL) transmission is expected to be transmitted by an eNodeB at subframe n and at subframe m<n an upper layer notifies a MAC layer that subframe n has changed to AN, the pending HARQ process may not be able to complete on the subframe interlace. Additionally, if the uplink transmission is negatively acknowledged by the eNodeB, as illustrated in FIG. 7C, the UE retransmits the packet at subframe n+4. If at subframe m<n+4 an upper layer notifies a MAC layer that subframe n+4 has changed to AN, then subframe n+4 is AN for UL transmission and the UE may not complete the retransmission.

According to one aspect, retransmissions on prohibited subframes may continue until a packet is acknowledged or a maximum number of attempts for retransmission is reached. During the retransmissions on prohibited subframes, the wireless network may not complete interference coordination because the requested subframe has not been released. Thus, there is a need for transitioning eNodeBs on the network to new ARPI.

Figure 8:
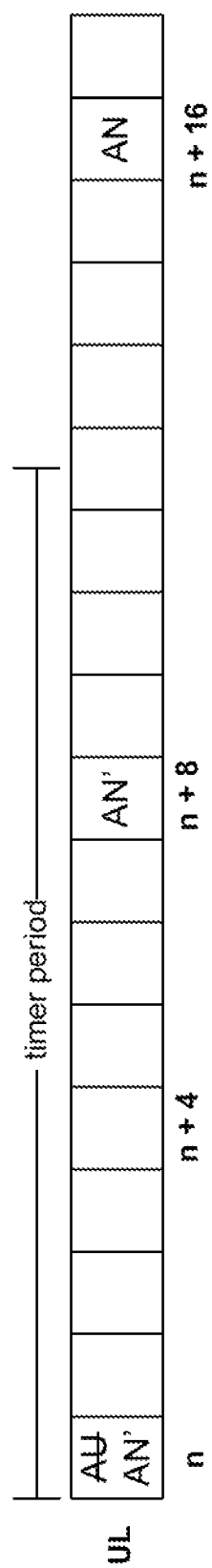
FIG. 8 illustrates a timer period activated during an ARPI change according to one aspect of the disclosure.

According to a first aspect, a timer may activate each time an ARPI change occurs to define a predetermined time period before sending an acknowledgement to the source eNodeB. FIG. 5A illustrates an example of timer-based interactions. At block 510, an upper layer of an eNodeB notifies the MAC layer of ARPI changes. At block 512 a timer is activated. At block 514, the timer expires and the scheduler is allowed to send an acknowledgement to the source eNodeB. The timer may improve transitioning a wireless network after ARPI changes by allowing graceful termination of HARQ processes. For example, during the timer period, an eNodeB scheduler may schedule only retransmission on the released subframe interlace. That is, the eNodeB scheduler does not allow new data for transmission on the released subframe. According to one aspect, when the timer is implemented on an eNodeB a new transient state is defined. In FIG. 8, the transient state is identified as AN' (or AN prime). The AN' transient stated may be defined for transitioning from a protected subframe (AU) interlace to a prohibited subframe (AN)

interlace during the timer period. Alternately, in another example, the transient state AN' (or AN prime) may be defined for transitioning from a common subframe (AC) interlace to a prohibited subframe (AN) interlace. During the transient state, the subframe is not used for scheduling new packets, but retransmission is allowed. In one configuration, the acknowledgment to the requesting eNodeB is implicit. This configuration is enabled by setting a timer for the same duration at the requesting eNodeB.

According to a second aspect, an upper layer may acknowledge the requestor eNodeB of the ARPI change even if a MAC layer is still using the subframe interlace for retransmissions. The acknowledgement to the requestor eNodeB is delayed by propagation delays in the backhaul network. The propagation delay allows HARQ processes using the released subframe to complete. The propagation delay may act in the wireless network as a non-deterministic timer. FIG. 5B illustrates an example of propagation-delay-based interactions. At block 520, an upper layer of an eNodeB notifies the MAC layer of ARPI changes. At block 522, the upper layer immediately sends an acknowledgement to the source eNodeB.

According to a third aspect, an interlayer acknowledgement is transmitted when an ARPI change occurs and all HARQ processes are completed. That is, the MAC layer may send an acknowledgement to an upper layer after HARQ processes using the subframe interlace are complete. The upper layer can then signal the requesting eNodeB. FIG. 5C illustrates an example, where an ARPI changes occurs at block 530. At block 512, the HARQ processes are completed and then at block 514, the MAC layer sends an acknowledgement to the upper layer. The eNodeB may enter a transient state between the time ARPI changes and the transmission of the acknowledgement after HARQ processes using the subframe interlace are complete. According to one aspect, a maximum number of HARQ attempts may be reduced during ARPI transitions to reduce or minimize latency and overhead. In another aspect, the interlayer acknowledgement is transmitted after receipt of a retransmission is acknowledged by a UE.

According to a fourth aspect, when notification is received by upper layers, the MAC layer stops scheduling any transmissions or retransmissions on the changed subframe interlace to stop all HARQ processes, as illustrated in FIG. 5D. At block 540 ARPI changes are occurring. At block 542, the upper layer receives notification and at block 544 the MAC layer stops scheduling any data. Upper layer techniques may be relied upon for error recovery, in this case. The MAC layer may stop scheduling transmissions and retransmissions in combination with transmitting an acknowledgement. For example, an interlayer acknowledgement may be transmitted and the HARQ process stopped to prevent scheduling any transmissions or re-transmissions on the changed subframe interlace. In one aspect, a base timeline for ACK processes already in transit (e.g., four ms) is still present and is accounted for.

Figure 9:
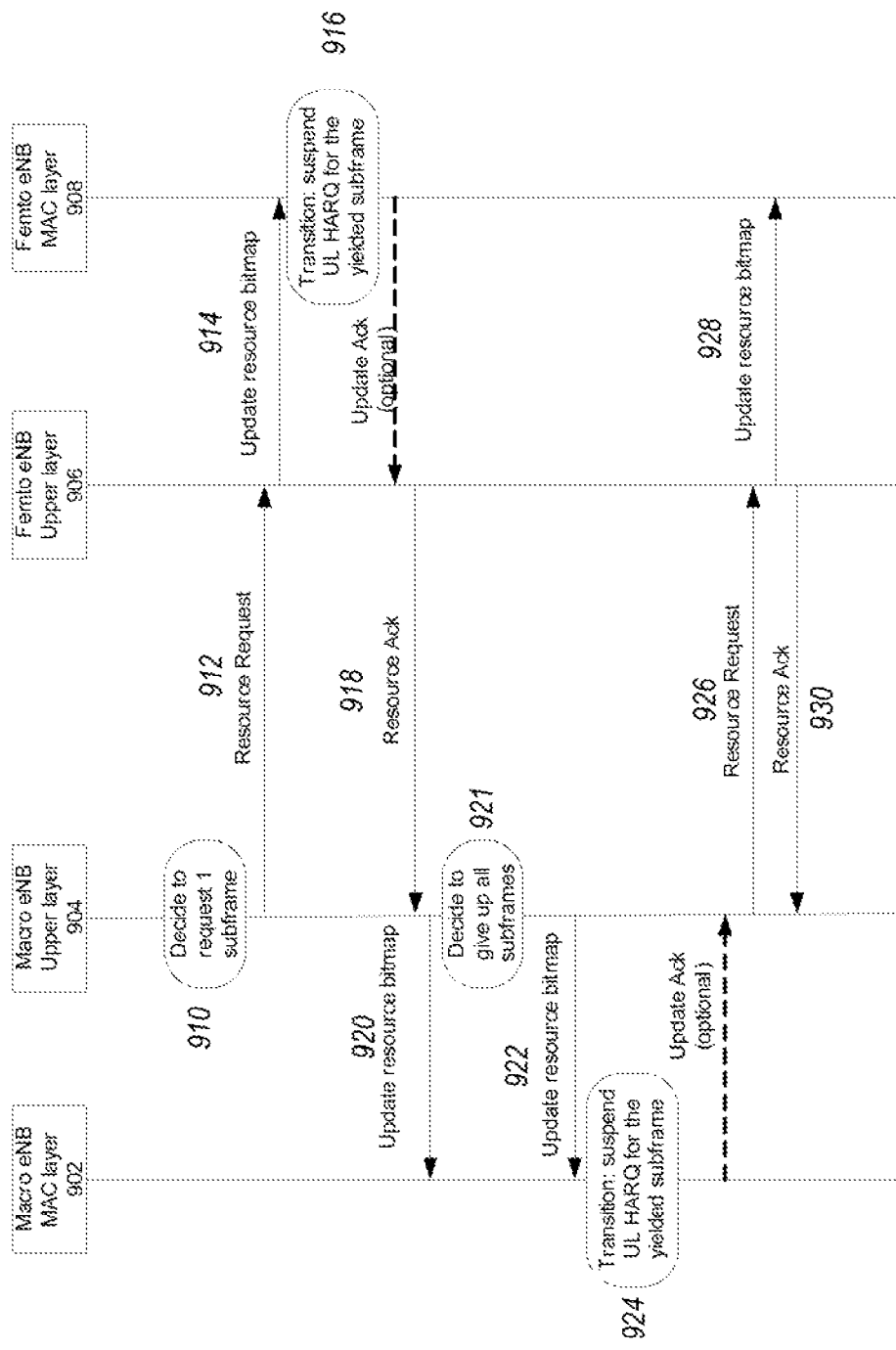
FIG. 9 is a call flow diagram illustrating interactions between a media access control (MAC) layer and an upper layer in a wireless network with adaptive resource partitioning information (ARPI) according to one aspect.

FIG. 9 is a call flow illustrating interactions between a media access control (MAC) layer and an upper layer in a wireless network with adaptive resource partitioning information (ARPI) according to one aspect. At time 910, a macro eNodeB upper layer 904 decides to request one subframe. At time 912, the macro eNodeB upper layer 904 transmits a resource request to a femto eNodeB upper layer 906, which instructs a femto eNodeB MAC layer 908 to update a resource bitmap at time 914.

At time 916 the femto eNodeB MAC layer transitions ARPI according to the update resource bitmap message, for example, by suspending uplink HARQ processes for the yielded subframe. At time 918 the femto eNodeB upper layer 906 transmits a resource acknowledgement to the macro eNodeB upper layer 904, which instructs the macro eNodeB MAC layer 902 to update the resource bitmap at time 920. Optionally, the femto eNodeB MAC layer 908 may send an acknowledgement of the update resource bitmap instruction to the femto eNodeB upper layer 906 before time 918 to confirm the ARPI change.

At time 921 the macro eNodeB upper layer 904 decides to give up all subframes. At time 922 the macro eNodeB upper layer 904 instructs the macro eNodeB MAC layer 902 to update the resource bitmap. At time 924, the macro eNodeB MAC layer 902 transitions the new ARPI indicated by the update resource bitmap instruction, for example, by suspending uplink HARQ for all subframes.

At time 926 the macro eNodeB upper layer 904 transmits a resource request message to the femto eNodeB upper layer 906. Optionally, the macro eNodeB MAC layer 902 may signal an update acknowledgement to the macro eNodeB upper layer 904 to confirm the ARPI change. At time 928, the femto eNodeB upper layer 906 instructs the femto eNodeB MAC layer 908 to update the resource bitmap, and the femto eNodeB upper layer 906 transmits a resource acknowledgement to the macro eNodeB upper layer 904 at time 930. According to one aspect, messages between the macro eNodeB upper layer 904 and the femto eNodeB upper layer 906 are conveyed over a backhaul network. According to another aspect, messages may be transferred over any network.

Figures 10A, 10B:
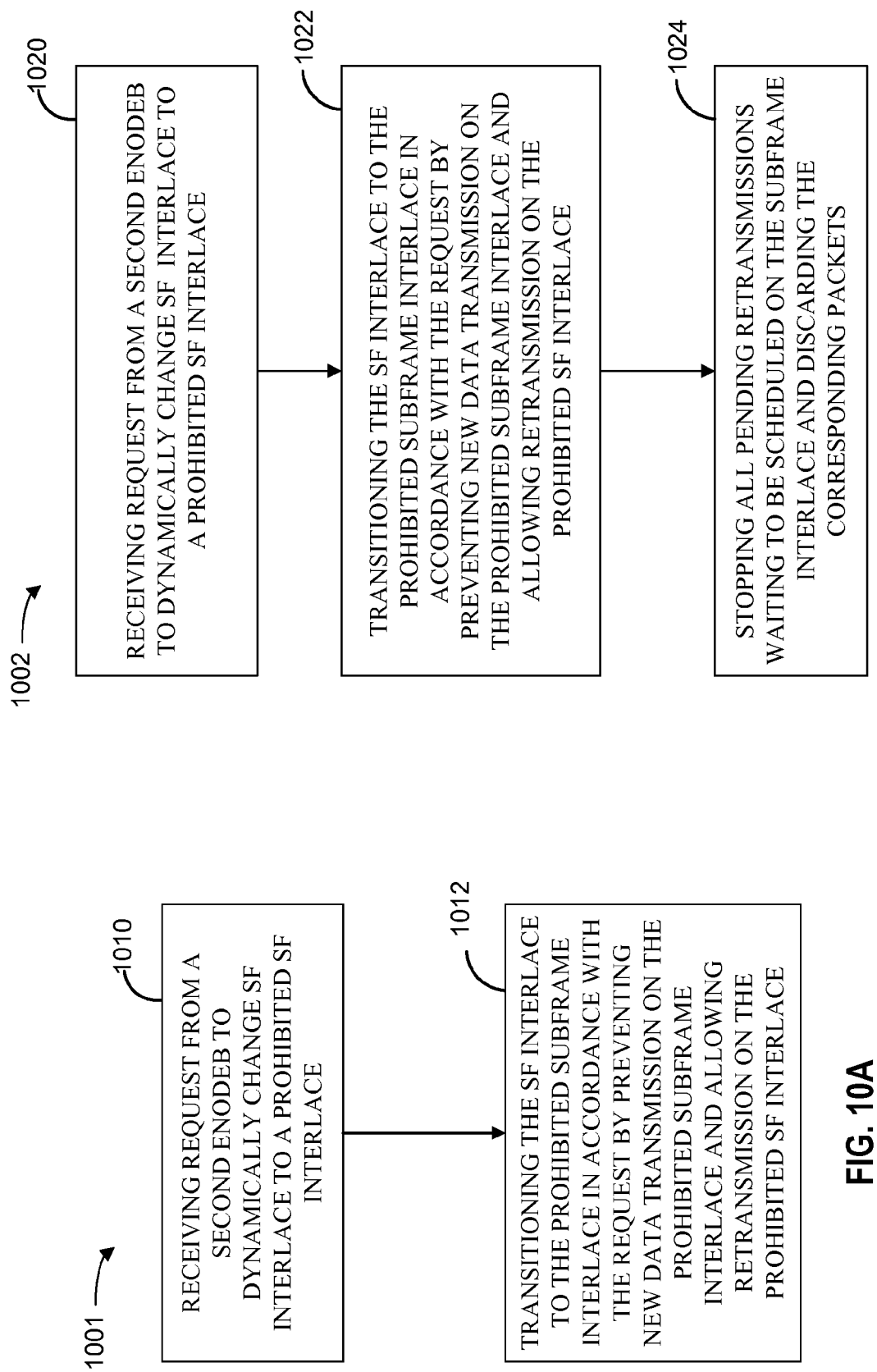
FIGS. 10A-B are block diagrams illustrating methods for transitioning eNodeBs to new adaptive resource partitioning information according to aspects of the present disclosure.

FIG. 10A illustrates a method 1001 for transitioning eNodeBs during ARPI. At block 1010, a request is received from a second eNodeB to dynamically change a subframe interlace to a prohibited subframe interlace. At block 1012, the subframe interlace is transitioned to a prohibited subframe interlace according to the request by preventing data transmission on the prohibited subframe interlace and allowing retransmission of the prohibited subframe interlace.

FIG. 10B illustrates a method 1002 for transitioning eNodeBs during ARPI. At block 1020 a request is received from a second eNodeB to dynamically change a subframe interlace to a prohibited subframe interlace. At block 1022, the subframe interlace is transitioned to the prohibited subframe interlace in accordance with the request by preventing new data transmission on the prohibited subframe interlace, and preventing pending retransmissions on the prohibited subframe interlace. At block 1024, all pending retransmissions waiting to be scheduled on the subframe interlace are stopped and discarding the corresponding packets.

In one configuration, the eNodeB 110 is configured for wireless communication including means for receiving. In one aspect, the receiving means may be the receive processor 438, demodulators 432a-t, controller/processor 430, memory 442, and antenna 434a-t configured to perform the functions recited by the receiving means. The eNodeB 110 is also configured to include a means for transitioning. In one aspect, the transitioning means may be the controller/processor 430 and memory 442 configured to perform the functions recited by the transitioning means. In another aspect, the aforementioned means may be a module or any apparatus configured to perform the functions recited by the aforementioned means.

In another configuration, the eNodeB 110 is configured for wireless communication including means for receiving. In one aspect, the receiving means may be the receive processor 438, demodulators 432a-t, controller/processor 430, memory 442, and antenna 434a-t configured to perform the functions recited by the receiving means. The eNodeB 110 is also configured to include a means for transitioning. In one aspect, the transitioning means may be the controller/processor 430 and memory 442 configured to perform the functions recited by the transitioning means. The eNodeB 110 is also configured to include a means for stopping. In one aspect, the stopping means may be the controller/processor 430 and memory 442 configured to perform the functions recited by the stopping means. In another aspect, the aforementioned means may be a module or any apparatus configured to perform the functions recited by the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   receiving an indication from a second eNodeB;
   determining, at a first eNodeB, to dynamically change a subframe interlace to an almost blank subframe interlace based at least in part on the indication; and
   transitioning the subframe interlace from a non-blank subframe interlace to the almost blank subframe interlace in accordance with the determination by preventing new data transmission on the almost blank subframe interlace and allowing retransmission on the almost blank subframe interlace.

2. The method of claim 1, in which allowing occurs for a predetermined time period.

3. The method of claim 2, in which after the time period expires, all remaining pending retransmissions are discarded and corresponding packets are considered failures.

4. The method of claim 2, further comprising transmitting an interlayer acknowledgement after expiration of the predetermined time period.

5. The method of claim 1, in which allowing occurs for all pending retransmissions.

6. The method of claim 5, further comprising transmitting an interlayer acknowledgement after all pending retransmissions that have been sent.

7. The method of claim 1, further comprising transmitting an acknowledgement to the second eNodeB immediately after the indication from the second eNodeB is received.

8. The method of claim 1, further comprising transmitting an acknowledgement to the second eNodeB when an interlayer acknowledgement is received from a medium access control (MAC) layer.

9. A method of wireless communication, comprising:
   receiving an indication from a second eNodeB;
   determining, at a first eNodeB, to dynamically change a subframe interlace to an almost blank subframe interlace based at least in part on the indication;

transitioning the subframe interlace from a non-blank subframe interlace to the almost blank subframe interlace in accordance with the determination by preventing new data transmission on the almost blank subframe interlace, and preventing pending retransmissions on the almost blank subframe interlace; and stopping all pending retransmissions waiting to be scheduled on the subframe interlace and discarding corresponding packets.

10. The method of claim 9, further comprising transmitting at least one of:
an interlayer acknowledgement and an acknowledgement to the second eNodeB.

11. An apparatus for wireless communication, comprising:
means for receiving an indication from a second eNodeB;
means for determining, at a first eNodeB, to dynamically change a subframe interlace to an almost blank subframe interlace based at least in part on the indication; and
means for transitioning the subframe interlace from a non-blank subframe interlace to the almost blank subframe interlace in accordance with the determining by preventing new data transmission on the almost blank subframe interlace and allowing retransmission on the almost blank subframe interlace.

12. An apparatus for wireless communication, comprising:
means for receiving an indication from a second eNodeB;
means for determining, at a first eNodeB, to dynamically change a subframe interlace to an almost blank subframe interlace based at least in part on the indication;
means for transitioning the subframe interlace from a non-blank subframe interlace to the almost blank subframe interlace in accordance with the determining by preventing new data transmission on the almost blank subframe interlace, and preventing pending retransmissions on the almost blank subframe interlace; and
means for stopping all pending retransmissions waiting for scheduling on the subframe interlace and discarding corresponding packets.

13. A computer program product for wireless communication in a wireless network, comprising:
a non-transitory computer-readable medium having program code recorded thereon, the program code comprising:
program code to receive an indication from a second eNodeB;
program code to dynamically change a subframe interlace, at a first eNodeB, to an almost blank subframe interlace based at least in part on the indication; and
program code to transition the subframe interlace from a non-blank subframe interlace to the almost blank subframe interlace in accordance with the indication by preventing new data transmission on the almost blank subframe interlace and allowing retransmission on the almost blank subframe interlace.

14. A computer program product for wireless communication in a wireless network, comprising:
a non-transitory computer-readable medium having program code recorded thereon, the program code comprising:
program code to receive an indication from a second eNodeB;
program code to dynamically change a subframe interlace, at a first eNodeB, to an almost blank subframe interlace based at least in part on the indication;
program code to transition the subframe interlace from a non-blank subframe interlace to the almost blank subframe interlace in accordance with the indication by preventing new data transmission on the almost blank subframe interlace, and preventing pending retransmissions on the almost blank subframe interlace; and
program code to stop all pending retransmissions that had to be scheduled on the subframe interlace and discard corresponding packets.

15. An apparatus for wireless communication, comprising:
a memory; and
at least one processor coupled to the memory, the at least one processor being configured:
to receive an indication from a second eNodeB;
to dynamically change a subframe interlace, at a first eNodeB, to an almost blank subframe interlace based at least in part on the indication; and
to transition the subframe from a non-blank subframe interlace to the almost blank subframe interlace in accordance with the indication by preventing new data transmission on the almost blank subframe interlace and allowing retransmission on the almost blank subframe interlace.

16. The apparatus of claim 15, in which allowing occurs for a predetermined time period.

17. The apparatus of claim 16, in which after the time period expires, all remaining pending retransmissions are discarded and corresponding packets are considered failures.

18. The apparatus of claim 16, in which the processor is further configured to transmit an interlayer acknowledgement after expiration of the predetermined time period.

19. The apparatus of claim 15, in which allowing occurs for all pending retransmissions.

20. The apparatus of claim 15, in which the processor is further configured to transmit an interlayer acknowledgement after all pending retransmissions that have been sent.

21. The apparatus of claim 15, in which the processor is further configured to transmit an acknowledgement to the second eNodeB immediately after the indication from the second eNodeB is received.

22. The apparatus of claim 15, in which the processor is further configured to transmit an acknowledgement to the second eNodeB when an inter-layer acknowledgement is received from a medium access control (MAC) layer.

23. An apparatus for wireless communication, comprising:
a memory; and
at least one processor coupled to the memory, the at least one processor being configured:
to receive an indication from a second eNodeB;
to dynamically change a subframe interlace, at a first eNodeB, to an almost blank subframe interlace based at least in part on the indication;
to transition the subframe interlace from a non-blank subframe interlace to the almost blank subframe interlace in accordance with the indication by preventing new data transmission on the almost blank subframe interlace, and preventing pending retransmissions on the almost blank subframe interlace; and
to stop all pending retransmissions that had to be scheduled on the subframe interlace and discard corresponding packets.

24. The apparatus of claim 23, in which the processor is further configured to transmit at least one of: an interlayer acknowledgement and an acknowledgement to the second eNodeB.

* * * * *